(12) United States Patent
Arimoto et al.

(10) Patent No.: US 7,936,488 B2
(45) Date of Patent: May 3, 2011

(54) IMAGE READING APPARATUS

(75) Inventors: Hironobu Arimoto, Tokyo (JP); Noriyuki Tomita, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 442 days.

(21) Appl. No.: 12/190,100

(22) Filed: Aug. 12, 2008

(65) Prior Publication Data

US 2009/0207462 A1  Aug. 20, 2009

(30) Foreign Application Priority Data

Feb. 15, 2008  (JP) .................... 2008-034460

(51) Int. Cl.
*G03F 3/08* (2006.01)
*G06F 15/00* (2006.01)
*G06K 15/00* (2006.01)
*G06K 9/00* (2006.01)

(52) U.S. Cl. ........ 358/518; 358/1.9; 358/2.99; 382/167; 382/318

(58) Field of Classification Search .................... 358/1.9, 358/518, 516, 529, 530, 538, 501, 2.99, 3.27, 358/410, 509; 382/137, 140, 162, 163, 167, 382/312, 318; 715/221, 223, 226

See application file for complete search history.

(56) References Cited

U.S. PATENT DOCUMENTS

| 5,010,580 | A | | 4/1991 | Vincent et al. |
| 5,014,328 | A | | 5/1991 | Rudak |
| 5,138,443 | A | * | 8/1992 | Ikeda et al. .................... 358/518 |
| 5,177,621 | A | * | 1/1993 | Ohtaki et al. ................. 358/406 |
| 5,216,498 | A | | 6/1993 | Matsunawa et al. |
| 5,499,111 | A | * | 3/1996 | Sato et al. .................... 382/252 |
| 5,631,983 | A | * | 5/1997 | Ohnishi et al. ................ 382/284 |
| 5,691,827 | A | * | 11/1997 | Kamei et al. .................. 358/530 |
| 5,703,694 | A | * | 12/1997 | Ikeda et al. .................... 358/296 |
| 5,838,463 | A | * | 11/1998 | Gahang .......................... 358/465 |
| 6,556,711 | B2 | * | 4/2003 | Koga et al. .................... 382/173 |
| 7,420,700 | B2 | * | 9/2008 | Hayashi ........................ 358/1.15 |
| 2002/0136447 | A1 | | 9/2002 | Link et al. |
| 2002/0176105 | A1 | * | 11/2002 | Kawai et al. .................. 358/1.9 |
| 2004/0218822 | A1 | * | 11/2004 | Takahashi .................... 382/237 |
| 2004/0233467 | A1 | * | 11/2004 | Namizuka .................... 358/1.13 |
| 2004/0234135 | A1 | * | 11/2004 | Nomizu ....................... 382/209 |
| 2004/0239996 | A1 | * | 12/2004 | Hayashi ....................... 358/3.03 |

(Continued)

FOREIGN PATENT DOCUMENTS

DE  199 04 997 A1  8/1999

(Continued)

*Primary Examiner* — Madeleine A Nguyen
(74) *Attorney, Agent, or Firm* — Oblon, Spivak, McClelland, Maier & Neustadt, L.L.P.

(57) ABSTRACT

An image reading apparatus includes: a light source emitting a plurality of colors; a light receiver including a plurality of pixels which receive lights of respective colors; an analog-to-digital converter which analog-to-digital converts analog signals obtained by the light receiver to obtain digital photoelectric conversion outputs, respectively; a color determining portion which receives output signals, determines whether output signals for respective colors from the same pixel are within predetermined ranges, respectively, and outputs, as dropout data, pixel position information of the pixel, the outputs signals from which are within the predetermined ranges, respectively; an image monochromating circuit which receives output signals and obtains monochrome data; a data substituting portion which receives the monochrome data, substitutes the monochrome data corresponding to the pixel position information from the color determining portion with a level at which the pixel is determined as a white level in a binarizing process.

10 Claims, 7 Drawing Sheets

U.S. PATENT DOCUMENTS

2006/0181725 A1* 8/2006 Matsuya ................ 358/1.9

FOREIGN PATENT DOCUMENTS

| JP | 4-49777 | 2/1992 |
| --- | --- | --- |
| JP | 5-501778 | 4/1993 |
| JP | 7-99559 | 4/1995 |
| JP | 8-223418 | 8/1996 |
| JP | 2003-216894 | 7/2003 |
| JP | 2004-112048 | 4/2004 |
| JP | 2005-303584 | 10/2005 |
| JP | 2006-339875 | 12/2006 |
| JP | 2007-19853 | 1/2007 |
| JP | 2007-88741 | 4/2007 |
| WO | WO 92/01998 | 2/1992 |

* cited by examiner

IMAGE READING APPARATUS

BACKGROUND OF THE INVENTION

1. Field of the Invention

The present invention relates to an image reading apparatus which is used for reading, for example, a form sheet in which the user fills a form printed in a predetermined format, such as a betting card or a mark sense card.

2. Description of the Related Art

A reading apparatus and an image processing apparatus are in widespread use. In such an apparatus, betting cards issued in various stadiums for horse racing, bicycle racing, boat racing, and the like, or those for lottery such as LOTO in which betting is performed by selecting one of printed numbers are read by a device, the written or selected numerical value or symbol is determined, and the reading result as a betting card record is notified and returned to the user.

In a betting card, usually, in order to improve the convenience of the user and simplify a process of specifying a written or selected numerical value or a symbol position in a reading apparatus, printing serving as a guide for writing or selection is performed in portions where a numerical value or symbol is to be written or selected. When numerical values or symbols written or selected by writing instruments of various colors or kinds are to be extracted from form sheets, such a guide printed portion constitutes unwanted information. Therefore, an image processing apparatus or drop processing apparatus which comprises means for dropping out a guide printed portion from a read image, and reading only a written or selected numerical value or symbol has been proposed.

For example, JP-A-2006-339875 discloses in FIG. 1 an image processing apparatus which performs a dropout process by extracting image data existing in a predetermined region of image information, and substituting a specific color with predetermined pixel data on the basis of extracted pixel data. A perceptible color space is divided into color space regions, typical colors of the color space regions are displayed as a color palette on a displaying device of the image processing apparatus, and the user selects a color to be dropped out, thereby designating the specific color. The image in which the specific color is substituted is displayed on the displaying device so that the user can check the process result.

JP-A-2003-216894 discloses in FIG. 1 a dropout process in which a histogram producing portion 14 performs SVH conversion on RGB of a subregion image to produce a histogram with respect to S, V, and H, a color information setting portion 15 obtains information of a color to be dropped out from the histogram, the value of the information is set in a color table to be stored, and, in the case where a pixel of a color image of a form sheet 3 corresponds to the color information of the color table, a binarizing portion 16 binarizes the pixel as a background pixel.

SUMMARY OF THE INVENTION

In the apparatus disclosed in JP-A-2006-339875, however, the specific color to be dropped out has to be selected while viewing the display, and it has to be ensured that the color of the displayed color palette is identical with that of the actual form sheet. With respect to variations of RGB read images, a correction input is required for each time, and hence there is a problem in that an environment in which the operator manages read results is necessary.

In the process disclosed in JP-A-2003-216894, dropout is determined on the basis of the histogram results of colors in the image of the form sheet, and hence results of read images of the whole form sheet are necessary. Therefore, an image recording portion for one form sheet, and a circuit dedicated for rapidly calculating the recorded image are required.

In the case where form sheets which are continuously supplied are processed, a dropout processing in a subsequent stage has to have a processing ability which can complete the process within the maximum number of continuous readable form sheets. Therefore, there is a problem in that a simple configuration hardly performs the dropout color process.

In such a related-art apparatus, a pixel to be dropped out is determined by using the color (RGB independent data) of image data of a form sheet, or a histogram thereof, and hence data which are obtained by a form sheet reading portion are processed as an aggregate of visible colors. Among color information, usually, there exist plural combinations of colors which can be visually recognized by a human to be identical with each other, and colors which are displayed on a displaying device are different in spectral wavelength configuration from those which are printed on a printed matter.

Therefore, reflected colors from a form sheet original are not reflected in the relationships between colors displayed on a displaying device and color information to be dropped out in an actual form sheet.

Also in the case where a dropout color is designated by using histogram information, although actual reflection data from an original are used in color designation, final color determination is performed by image determination based on a specific-color plane after a dropout plane is determined. Therefore, uncertainty remains in color determination of an intermediate color.

Accordingly, it is an aspect of the invention to provide an image reading apparatus in which, according to the spectral reflectance with respect to the light wavelength of a printed form sheet and numerals, characters, or symbols that are written or selected by the user, image data are collected while irradiating the form sheet with plural illumination wavelengths, characteristics of read image data of a printed portion to be dropped out, from the form sheet depending on the wavelengths of illumination light are extracted, and a pixel to be dropped out is substituted with data which are determined white in binarization, whereby separation between a dropout portion and a user written portion can be performed in real time by a small-scale circuit.

(1) According to an exemplary embodiment of the present invention, there is provided an image reading apparatus comprising: a light source which sequentially emits lights having a plurality of colors with a plurality of wavelengths to an original; a lens which converges lights reflected from the original; a light receiver including a plurality of pixels, each of which receives lights converged by the lens and performs photoelectric conversion to obtain analog signals for respective colors; an analog-to-digital converter which analog-to-digital converts the analog signals obtained by the light receiver to obtain digital photoelectric conversion outputs, respectively; a correcting portion which corrects the digital photoelectric conversion outputs; a synchronizing circuit which synchronizes the corrected digital photoelectric conversion outputs from a same pixel with each color and outputs output signals for entire pixels; a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively; an image monochromating circuit which receives the output signals from the synchronizing circuit, multiplies the output signals by constant data defined for each color, respectively and adds the multiplied output signals from the same pixel to outputs the addition result as monochrome data; a data substituting portion which receives the monochrome data, substitutes the monochrome data corresponding to the pixel position information from the color determining portion with a level at which the pixel is determined as a white level in a binarizing process, and outputs a signal; and an output portion which binarizes the signal output from the data substituting portion and outputs the binarized signal. The correcting portion may include: a black correcting portion which receives the digital photoelectric conversion outputs and performs a black correction with which digital photoelectric conversion outputs from each pixel at a dark time becomes even; and a white correcting portion which receives the digital photoelectric conversion outputs subjected to the black correction and performs a white correction with which digital photoelectric conversion outputs from each pixel at a bright time becomes even.

(2) According to another exemplary embodiment of the present invention, there is provided an image reading apparatus comprising: a light source which sequentially emits lights having a plurality of colors with a plurality of wavelengths to an original; a lens which converges lights reflected from the original; a light receiver including a plurality of pixels, each of which receives lights converged by the lens and performs photoelectric conversion to obtain analog signals for respective colors; an analog-to-digital converter which analog-to-digital converts the analog signals obtained by the light receiver to obtain digital photoelectric conversion outputs, respectively; a correcting portion which corrects the digital photoelectric conversion outputs; a synchronizing circuit which synchronizes the corrected digital photoelectric conversion outputs from a same pixel with each color and outputs output signals for entire pixels; a multiplier which performs multiplication on the output signals from the synchronizing circuit for each color; a color determining portion which receives the multiplied output signals from the multiplier, determines whether the multiplied output signals for respective colors from the same pixel are within predetermined ranges, respectively, and outputs, as dropout data, pixel position information of the pixel, the outputs signals from which are within the predetermined ranges, respectively; an image monochromating circuit which receives the output signals from the synchronizing circuit, multiplies the output signals by constant data defined for each color, respectively and adds the multiplied output signals from the same pixel to outputs the addition result as monochrome data; and a data substituting portion which receives the monochrome data, substitutes the monochrome data corresponding to the pixel position information from the color determining portion with a level at which the pixel is determined as a white level in a binarizing process, and outputs a signal; and an output portion which binarizes the signal output from the data substituting portion and outputs the binarized signal. The correcting portion may include: a black correcting portion which receives the digital photoelectric conversion outputs and performs a black correction with which digital photoelectric conversion outputs from each pixel at a dark time becomes even; and a white correcting portion which receives the digital photoelectric conversion outputs subjected to the black correction and performs a white correction with which digital photoelectric conversion outputs from each pixel at a bright time becomes even.

(3) According to a still another aspect of the present invention, there is provided an image reading apparatus comprising: a light source which sequentially emits lights having a plurality of colors with a plurality of wavelengths to an original; a lens which converges lights reflected from the original; a light receiver including a plurality of pixels, each of which receives lights converged by the lens and performs photoelectric conversion to obtain analog signals for respective colors; an analog-to-digital converter which analog-to-digital converts the analog signals obtained by the light receiver to obtain digital photoelectric conversion outputs, respectively; a correcting portion which corrects the digital photoelectric conversion outputs; a synchronizing circuit which synchronizes the corrected digital photoelectric conversion outputs from a same pixel with each color and outputs output signals for entire pixels; a plurality of color determining portions, each of which receives the outputs signals from the synchronizing circuit, determines whether the output signals for respective colors from the same pixel are within predetermined ranges, respectively, and outputs, as dropout data, pixel position information of the pixel, the output signals from which are within the predetermined ranges, respectively, wherein the ranges are different between the plurality of color determining portions; a logic matching portion which matches or selects the pixel position information from the plurality of color determining portions according to a selection signal; an image monochromating circuit which receives the output signals from the synchronizing circuit, multiplies the output signals by constant data defined for each color, respectively and adds the multiplied output signals from the same pixel to outputs the addition result as monochrome data; a data substituting portion which receives the monochrome data, substitutes the monochrome data corresponding to the pixel position information selected or matched in the logic matching portion according to the selection signals with a level at which the pixel is determined as a white level in a binarizing process, and outputs a signal; and an output portion which binarizes the signal output from the data substituting portion and outputs the binarized signal. The correcting portion may include: a black correcting portion which receives the digital photoelectric conversion outputs and performs a black correction with which digital photoelectric conversion outputs from each pixel at a dark time becomes even; and a white correcting portion which receives the digital photoelectric conversion outputs subjected to the black correction and performs a white correction with which digital photoelectric conversion outputs from each pixel at a bright time becomes even.

(4) According to a further aspect of the present invention, there is provided an image reading apparatus comprising: a light source which sequentially emits lights having a plurality of color with a plurality of wavelengths to an original, and which is longer than an original reading width; a reference plate which is disposed outside the original reading width; a lens which converges lights reflected from the reference plate and the original; a light receiver including a plurality of pixels, each of which receives lights converged by the lens and performs photoelectric conversion to obtain analog signals for respective colors; an analog-to-digital converter which analog-to-digital converts the analog signals obtained by the light receiver to obtain digital photoelectric conversion outputs, respectively; a correcting portion which corrects the digital photoelectric conversion outputs; a digital variable portion which compares information obtained by reading light reflected from the reference plate with a predetermined reference value and which adjusts the corrected digital photoelectric conversion outputs; a synchronizing circuit which synchronizes the adjusted digital photoelectric conversion outputs from a same pixel with each color and outputs output signals for entire pixels; a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively; an image monochromating circuit which receives the output signals from the synchronizing circuit, multiplies the output signals by constant data defined for each color, respectively and adds the multiplied output signals from the same pixel to outputs the addition result as monochrome data; a data substituting portion which receives the monochrome data, substitutes the monochrome data corresponding to the pixel position information from the color determining portion with a level at which the pixel is determined as a white level in a binarizing process, and outputs a signal; and an output portion which binaries the signal output from the data substituting portion and outputs the binarized signal, wherein, if the information obtained by reading light reflected from the reference plate is higher than the predetermined reference value, the digital variable portion decreases the corrected digital photoelectric conversion outputs, and if the information obtained by reading light reflected from the reference plate is lower than the predetermined value, the digital variable portion increases the corrected digital photoelectric conversion outputs such that input of the synchronizing circuit to be the predetermined reference value. The correcting portion may include: a black correcting portion which receives the digital photoelectric conversion outputs and performs a black correction with which digital photoelectric conversion outputs from each pixel at a dark time becomes even; and a white correcting portion which receives the digital photoelectric conversion outputs subjected to the black correction and performs a white correction with which digital photoelectric conversion outputs from each pixel at a bright time becomes even.

(5) According to a still further aspect of the present invention, there is provided an image reading apparatus comprising: a light source which sequentially emits lights having a plurality of colors with a plurality of wavelengths to an original; a lens which converges lights reflected from the original; a light receiver including a plurality of pixels, each of which receives lights converged by the lens and performs photoelectric conversion to obtain analog signals for respective colors; an analog-to-digital converter which analog-to-digital converts the analog signals obtained by the light receiver to obtain digital photoelectric conversion outputs, respectively; a correcting portion which corrects the digital photoelectric conversion outputs; a synchronizing circuit which synchronizes the corrected digital photoelectric conversion outputs from a same pixel with each color and outputs output signals for entire pixels; a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively; an image monochromating circuit which receives the output signals from the synchronizing circuit, multiplies the output signals by constant data defined for each color, respectively and adds the multiplied output signals from the same pixel to outputs the addition result as monochrome data; a background detecting portion which receives the monochrome data from the image monochromating circuit, and which detects a peak output of the monochrome data; a data substituting portion which receives the monochrome data and the peak output of the monochrome data, substitute the monochrome data corresponding to pixel position information from the color determining portion with the peak output of the monochrome data at which the pixel is determined as a white level in binarizing process, and outputs a signal; and an output portion which binarizes the signal output from the data substituting portion and outputs the binarized signal. The correcting portion may include: a black correcting portion which receives the digital photoelectric conversion outputs and performs a black correction with which digital photoelectric conversion outputs from each pixel at a dark time becomes even; and a white correcting portion which receives the digital photoelectric conversion outputs subjected to the black correction and performs a white correction with which digital photoelectric conversion outputs from each pixel at a bright time becomes even.

According to the exemplary embodiment of (1), the synchronizing circuit aligns image data that are sequentially obtained for each emission colors, as color information in units of pixel, the color determining portion determines a pixel position where, when data for emission colors at the same pixel position are within the range where the upper and lower limits are predetermined, the data is set as a dropout data, the image monochromating circuit adds same pixel position data which are obtained by multiplying the data with a constant data that is determined for each of emission colors, to form the multiplication result as a monochrome data, and the data substituting portion substitutes the pixel of the monochrome data corresponding to pixel position information of the color determining portion, with a data to be dropped out. Therefore, it is possible to obtain an image reading apparatus in which image data to be subjected to the dropout color process can be produced in real time by a small-scale circuit, and the print ground and guide printed portion of an original (form sheet) can be surely skipped.

According to the exemplary embodiment of (2), the synchronizing circuit aligns image data that are sequentially obtained for each emission colors, as color information in units of pixel, the color determining portion determines a pixel position where, when, after one output branching from the color image position synchronizing circuit is amplified by the multiplier in units of emission color, data for emission colors at the same pixel position are within the range where the upper and lower limits are predetermined, the data is set as a dropout data, the image monochromating circuit adds same pixel position data which are obtained by multiplying the data with a constant data that is determined for each of emission colors, to form the multiplication result as a monochrome data, and the data substituting portion substitutes the pixel of the monochrome data corresponding to pixel position information of the color determining portion, with a data to be dropped out. When the output data for the emission colors are low, therefore, the dynamic range of the upper and lower limits designated by the color determining portion is increased, and then the dropout pixel position is selected, and hence there is an effect that the position of a pixel to be dropped out can be specified highly accurately.

According to the exemplary embodiment of (3), the synchronizing circuit aligns image data that are sequentially obtained for each emission colors, as color information in units of pixel, image data are input to the plural color determining portions, the pixel position is determined from selected or matched data from the plural color determining portions having different ranges of designating a dropout data when data for emission colors at the same pixel position are within the range where the upper and lower limits are predetermined, the image monochromating circuit adds same pixel position data which are obtained by multiplying the data with a constant data that is determined for each of emission colors, to form the multiplication result as a monochrome data, and the data substituting portion substitutes the pixel of the monochrome data corresponding to pixel position information of the color determining portions, with a data to be dropped out. When predetermined upper and lower limits are set over the plural color determining portions, and the plural color determining portions select the position of a dropout pixel through the logic matching portion, therefore, there is an effect that the position of a pixel to be dropped out can be specified highly accurately.

According to the exemplary embodiment of (4), the digital variable portion is added in front of the synchronizing circuit, the color image position synchronizing circuit then aligns image data that are sequentially obtained for each emission colors, as color information in units of pixel, the color determining portion determines a pixel position where, when data for emission colors at the identical pixel position are within the range where the upper and lower limits are predetermined, the data is set as a dropout data, the image monochromating circuit adds same pixel position data which are obtained by multiplying the data with a constant data that is determined for each of emission colors, to form the multiplication result as a monochrome data, and the data substituting portion substitutes the pixel of the monochrome data corresponding to pixel position information of the color determining portion, with a data to be dropped out. Therefore, there is an effect that the input range of the synchronizing circuit is decreased and stable color information in units of pixel can be derived.

According to the exemplary embodiment of (5), the one signal branching from the output of the image monochromating circuit is input into the background detecting portion, and the background detecting portion detects the peak output value of the monochrome data of the image monochromating circuit. When the peak output value is recognized as the ground density of the monochrome image, therefore, the data substituting portion can easily produce substitution data for a dropout designated pixel, and the pixel data become identical with the data of the ground of the original. Therefore, there are effects that the quality of the image of the original is improved, and that, in binarization, a pixel to be dropped out is surely dropped out in the same manner as a white ground of the original.

BRIEF DESCRIPTION OF THE DRAWINGS

Embodiments of the present invention will be described in detail based on the following figures, wherein.

DETAILED DESCRIPTION OF THE INVENTION

Embodiment 1

Figure 1:
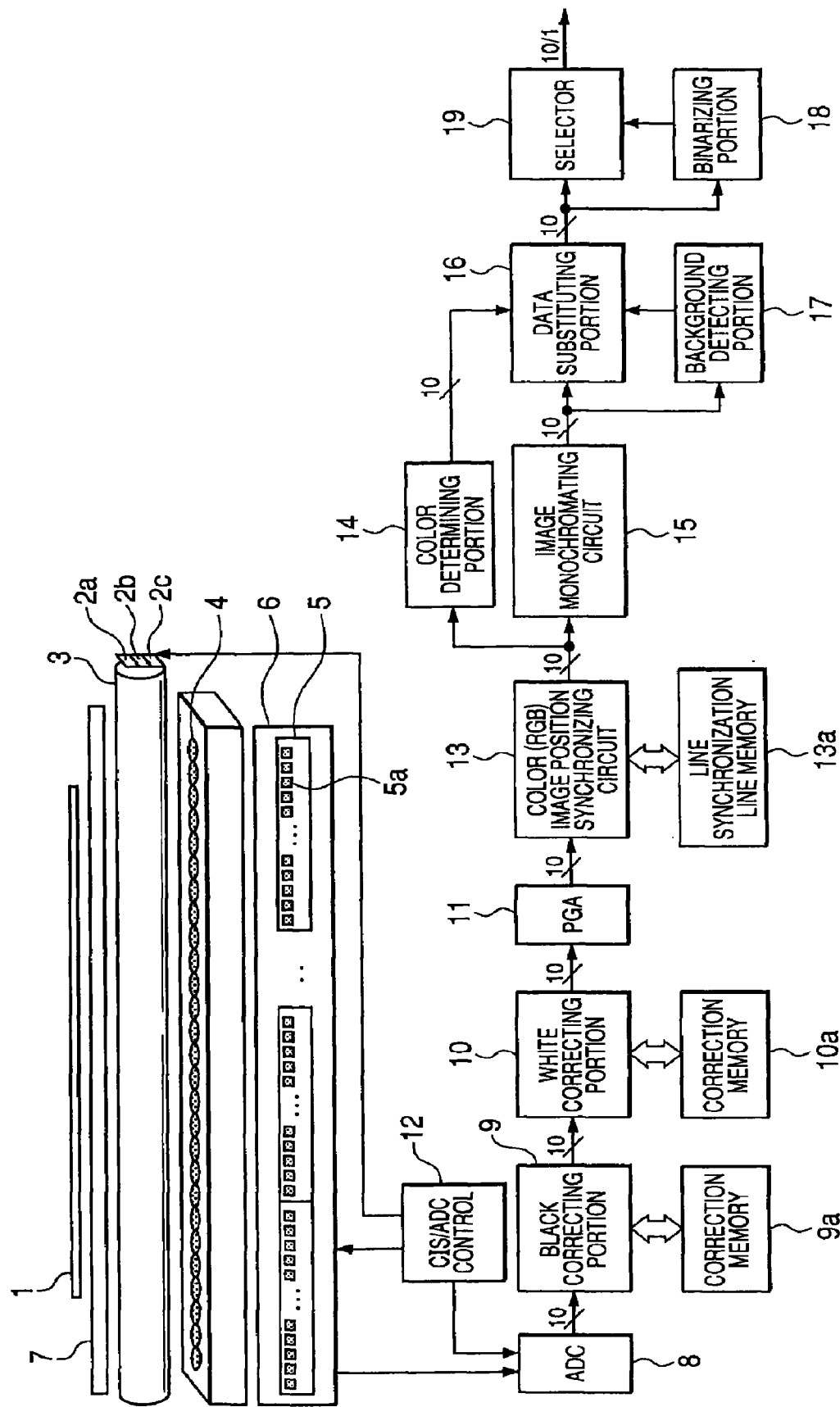
FIG. 1 is a functional block diagram of an image reading apparatus of Embodiment 1 of the invention.

Hereinafter, Embodiment 1 of the invention will be described with reference to FIG. 1. FIG. 1 is a block configuration diagram of an image reading apparatus of Embodiment 1. In FIG. 1, 1 denotes an original (form sheet) such as a betting card or a mark sense card, on which a predetermined format is printed, 2 denotes light sources such as LED chips, 2a denotes a red light source (R light source), 2b denotes a green light source (G light source), and 2c denotes a blue light source (B light source). 3 denotes a light guiding member through which light emitted from the light sources 2 propagates toward the direction of reading the original 1, and which causes the light to be impinged on the original 1, 4 denotes a rod lens array (lens) which converges the light impinged on and reflected from the original 1, 5 denotes a light receiving portion (sensor chip) which includes a driving portion, and in which a plurality of photoelectrical converting elements are linearly arranged in the reading direction, and 5a denotes a part of the light receiving portion 5 (hereinafter referred to as a pixel). 6 denotes a sensor board on which the sensor chip 5 is mounted.

7 denotes a glass plate (transmission member) which is interposed between the original 1 and the light guiding member 3, and through which the light from the light sources 2 is passed, 8 denotes an analog to digital converter (ADC) which analog-to-digital converts an analog signal that is obtained by photoelectrical conversion in the sensor chip 5, 9 denotes a black correcting portion which corrects variation of the black level, 9a denotes a memory for the black correction, 10 denotes a white correcting portion which corrects variation of the white level, 10a denotes a memory for the white correction, 11 denotes a PGA (Programmable Gain Amplifier) which adjusts the gains of signals for respective emission colors, and 12 denotes a controlling portion which supplies the electric power and control signals to the light sources 2, the sensor chip 5, and the ADC 8.

13 denotes an image position synchronizing circuit which is configured by a synchronization line memory 13a and the like, and which, for each emission colors, sequentially aligns image data that are read in time sequence, with color information that is read by each line pixel, 14 denotes a color determining portion which determines a position of a pixel that is set as a dropout data, if a data for respective emission colors at the same pixel position are within predetermined ranges, each defined by an upper limit and a lower limit, 15 denotes an image monochromating circuit which multiplies the data with a constant value that is determined for each of emission colors, and which then adds the same pixel position data to take the addition result as a monochrome data, 16 denotes a data substituting portion which substitutes the pixel of the monochrome data corresponding to pixel position information of the color determining portion, with a data to be dropped out, 17 denotes a background detecting portion which detects the maximum value of the monochrome data of the image monochromating circuit 15, and which outputs by reference the reflection density of the ground of the original 1 to the data substituting portion 16, 18 denotes a binarizing portion which binarizes image data in which a pixel data of the data substituting portion 16 is substituted by the designation of the color determining portion 14, with a predetermined value, and 19 denotes a selector which outputs image data that have undergone the dropout color process. In the figures, the same reference numerals denote the same or corresponding portions.

Next, the operation will be described. Referring to FIG. 1, in accordance with the speed at which the original (form sheet) 1 is transported, the light sources 2a, 2b, 2c sequentially repeat turn on/off operations to control on/off of illumination. As a result of the individual on/off control, the photoelectric conversion is performed in the sensor chip 5, and image data which correspond to the illumination color, and which are in the form of an analog signal are sequentially digitized by the analog-to-digital converter 8. In the black correcting portion 9, the black correction is performed in a state where the light sources 2 are turned off (do not operate), and hence there are a case where fixed pattern noises of the light receiving portion 5 are corrected among over the all pixels (all pixel correction), and another case where the noises are corrected in among a unit of pixels. In both the cases, correction of aligning with a constant value (for example, "0h" with an accuracy of 10 bits) is performed by known means. These correction data are stored in the correction memory 9a. The illumination intensity of the light sources 2 and the sensitivity of the sensor chip 5 are varied in the main scanning direction (the arrangement direction of the sensor chip 5). Therefore, the white correcting portion 10 performs the white correction of correcting variation of the dynamic range of image data due to variations of the illumination intensity and the sensitivity of the sensor chip 5. These correction data are stored in the correction memory 10a. In the PGA 11, the image data outputs from the light sources 2 are amplified for each colors.

Next, the dropout color process will be described. In order to perform color determination, all image line data which are obtained by reading the same line on the form sheet 1 are synchronized with one another so that data which are input as image line data for each colors are allowed to be determined in units of pixel as color information. Therefore, the color (RGB) image position synchronizing circuit 13 which is in the stage preceding the color determining portion 14 performs a process of synchronizing image positions so that three RGB color data are simultaneously output to the subsequent circuit for each pixel. The synchronized image data are sent to the color determining portion 14, and a color to be dropped out is determined for each pixel.

On the basis of the color image information which is synchronized in units of pixel in the color image position synchronizing circuit 13, the color determining portion 14 determines whether the color data which are obtained by photoelectric conversion exist within the predetermined range or not. If the all color data exist within the predetermined range in units of pixel, the data which are read by the photoelectrical converting element are determined to be dropped out. The dropout determination is performed in synchronization with the pixel which is processed by the image monochromating circuit 15. In the data substituting portion 16, the value of the pixel which is determined to be dropped out is substituted with the preset pixel value in real time. As a result of this process, the image to be dropped out is erased, and, in the binarizing process in the subsequent binarizing portion 18, surely skipped as a ground or non-image.

Figure 2:
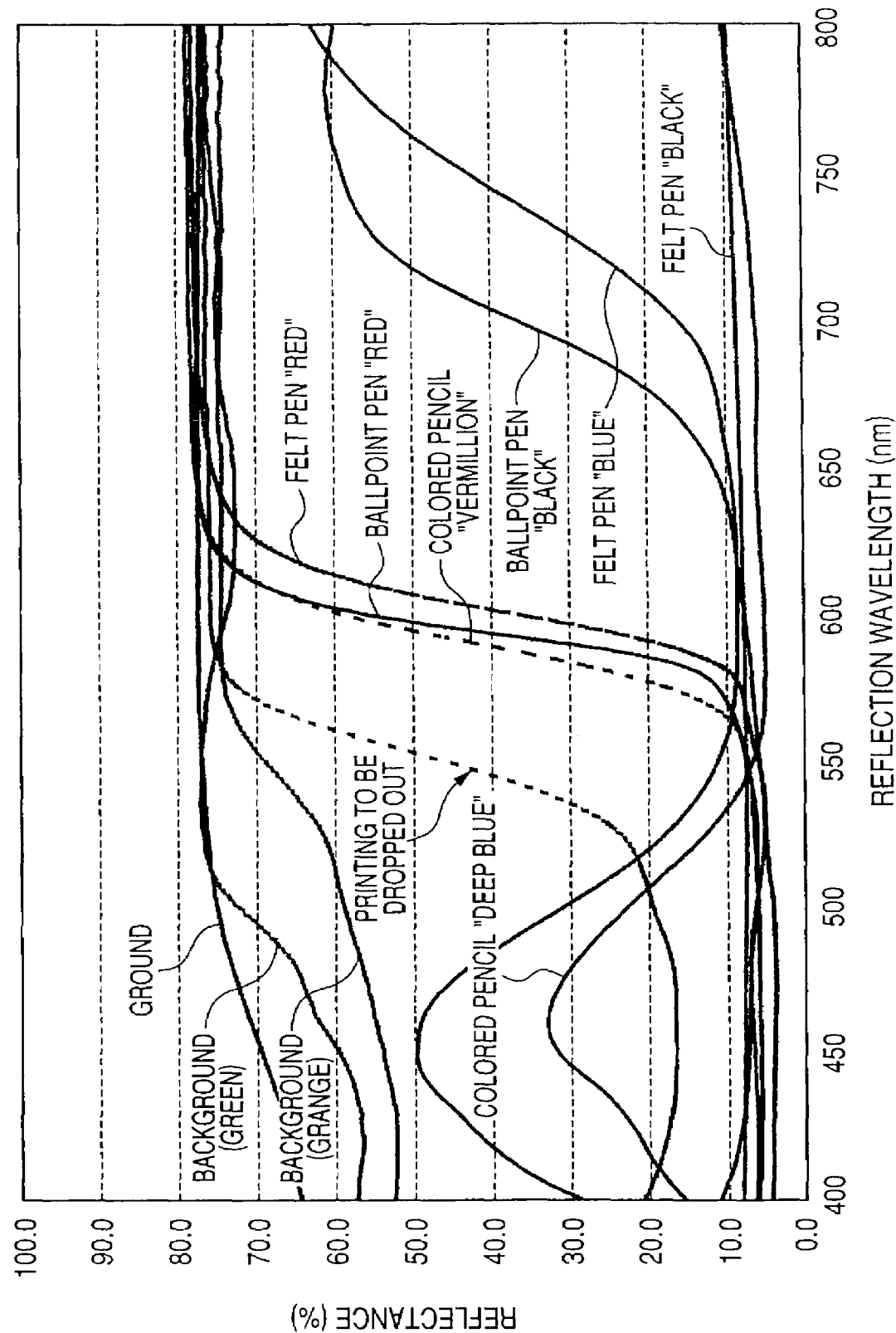
FIG. 2 is a view illustrating an example of the spectral reflection spectrum of a form sheet.
Figure 3:
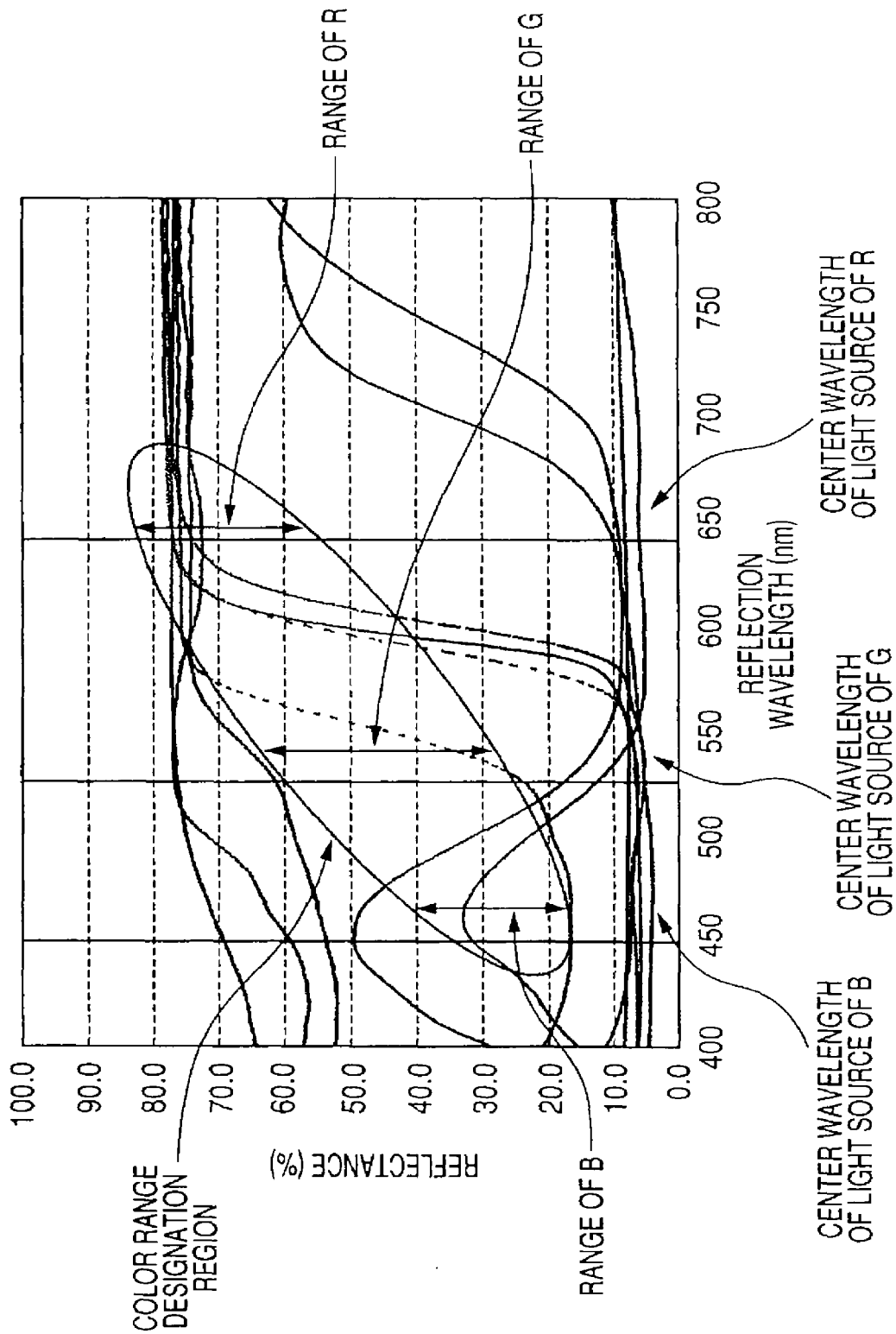
FIG. 3 is a view illustrating color range designation of the wavelength of a light source.

In the determination, as shown in FIG. 3, the determination of orange is performed by using the three RGB light sources in accordance with the measurement results which are shown in an example of the spectral reflection spectrum of the form sheet 1 shown in FIG. 2, and which indicate the spectral reflectances of the form sheet 1 and writing instruments used in marking.

In the case of a printed pattern, for example, the spectral reflectances shown in FIG. 2 are determined in accordance with the composition of a used printing ink and combination.

In FIG. 2, the reflectance of the paper on which printing is to be performed is shown as the ground, and the background shows low-density printing of a portion corresponding to a background on which characters, symbols, and the like are printed. In the form sheet 1, a color to be skipped (to be dropped out) is the reflection pattern indicated by "PRINTING TO BE DROPPED OUT", and characterized in that the reflectance is suddenly changed in the vicinity of an optical wavelength of 550 nm. It is known that the other reflectance data exhibit reflectances of writing instruments which will be used in marking by the user, and have spectral characteristics in which the reflectance intensity is high in the red and blue regions.

As a result, as shown in FIG. 3, it is known that, in order to extract orange which is a color to be skipped (to be dropped out), determination may be performed by using a green image as a parameter for a main determination, and further considering information of red and blue.

For example, estimate output values of printing of a mark runner portion of a form sheet in the case where conversion is performed while assuming that the ground color of the back face of the form sheet 1 is 100%, RGB light sources are used, and sequential color reading is performed are shown in the following table.

TABLE 1

|  | R | G | B |
|---|---|---|---|
| Form sheet of orange ground | 98.3% | 49.0% | 35.0% |
| Form sheet of green ground | 96.3% | 40.2% | 24.2% |

These outputs are converted to digital values of an image, and pixels of a dropout portion of the form sheet 1 are determined. Specifically, considering printing unevenness and variations of the density and the like, the color range centered at the value is designated in the color determining portion 14, and a pixel having a color to be dropped out is substituted in the data substituting portion 16 with a ground color having a high reflectance such as white, whereby, before binarization, the pixel to be dropped out is eliminated from the image data.

As an example of Embodiment 1, a test of reading the form sheet 1 is performed while designating a pixel in which color data exist in ranges of 200 to 255 digits for a red data, 120 to 255 digits for a green data, and 0 to 200 digits for a blue data, as determination values designating RGB dropout pixels with respect to the RGB image data that are read. As a result of this process, the test results confirm that about 100% of the runner portion are designated as a dropout pixel.

Next, the image data which are sent from the image position synchronizing circuit 13 to the color determining portion 14 are simultaneously sent also to the image monochromating circuit 15, and monochromation of the image is performed at a predetermined mixture ratio. In the image monochromating circuit 15, on the basis of the color image information which is synchronized in units of pixel in the color image position synchronizing circuit 13, the color data are calculated by the following expression in a predetermined ratio, whereby monochrome image output data are produced based on the following expression.

$$I(n) = \{Ir(n)*Cr\} + \{Ig(n)*Cg\} + \{Ib(n)*Cb\}$$

where Ir(n): data of an n-th pixel of the red light source, Ig(n): data of an n-th pixel of the green light source, Ib(n): data of an n-th pixel of the blue light source, Cr: a coefficient of the red light source, Cg: a coefficient of the green light source, Cb: a coefficient of the blue light source, and I(n): a monochromated output of an n-th pixel.

The monochromating process is performed for pre-processing of image binarization in a subsequent stage and specifying of a color-determined pixel. The pixel position information which is determined in the color determining portion 14 is used for the monochromated image, a substituting process of a preset value which is surely determined as white in the binarization is performed on a pixel to be dropped out, and a monochrome image in which a portion to be dropped out is deleted is produced.

The image reading apparatus may output the monochrome information. Since mark information is requested only to enable determination of existence of a mark to be performed, the monochrome image data are sent to the subsequent binarizing portion 18, and binarized with a predetermined slice level to be formed as black and white binary data. In this process, information of a pixel to be skipped (to be dropped out) is previously substituted with the value which is surely determined as white in the binarization, and hence it is requested only to consider the contrast of the ground of the form sheet 1 and a written mark.

Therefore, it is possible to obtain an image reading apparatus in which image data to be subjected to the dropout color process can be produced in real time by a small-scale circuit, and the print ground and guide printed portion of a form sheet or the like can be surely skipped.

Furthermore, a data peak of a monochromated image can be detected, the peak value can be set as the ground density of the monochrome image, and the data substituting portion can produce substitution data of a dropout designated pixel. The pixel data become identical with the data of the ground of the original. Therefore, there are effects that the quality of the image of the original is improved, and that, in binarization, the data are surely recognized as a white ground.

Embodiment 2

In Embodiment 1, the basic configuration of the image reading apparatus of the invention has been described. In a read image of a form sheet, usually, the difference between a dropout color and the color of a writing instrument used in marking is very small, and there is a case where, when the read image is subjected to color determination without being further processed, a problem occurs in accuracy of the color separation. In Embodiment 2, therefore, a configuration where the dynamic range is increased and then color determination is performed will be described with reference to FIG. 4.

Figure 4:
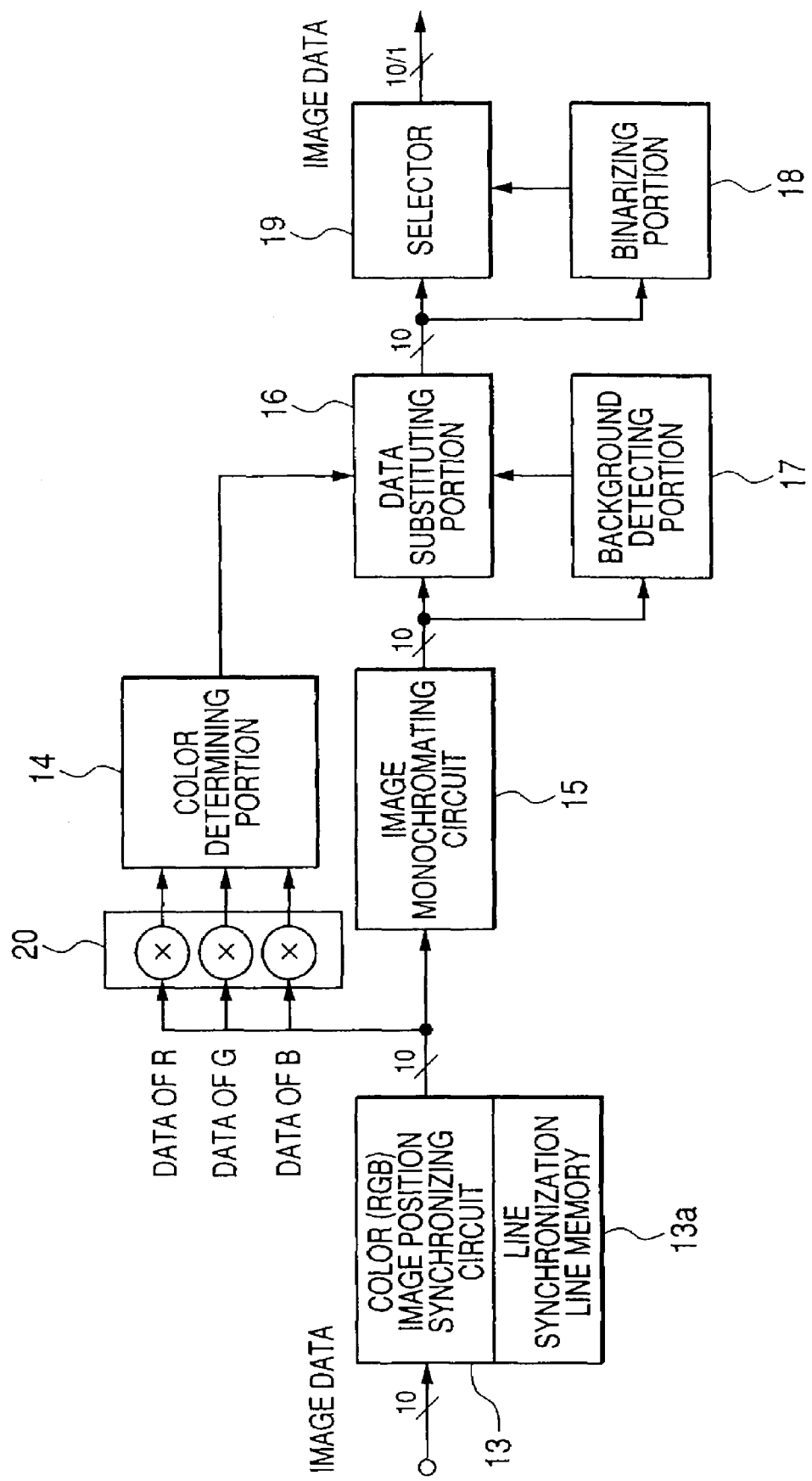
FIG. 4 is a functional block diagram of a dropout processing portion of an image reading apparatus of Embodiment 2 of the invention.

FIG. 4 is a functional block diagram of a dropout processing portion of an image reading apparatus of Embodiment 2 of the invention. In FIG. 4, 20 denotes a multiplier which is branched from the output of the color image position synchronizing circuit 13, and supplies a multiplication result to the color determining portion 14. In the figure, the same reference numerals as FIG. 1 denote the same or corresponding portions. In order to multiply the color data by a predetermined gain in the previous stage of the color determining portion 14, the multiplier 20 performs a function of multiplying image data with a preset value which corresponds to each color, thereby expanding (magnifying) a portion which is concentrated into an intermediate tone region necessary for color determination, and which is required in color determination, for example, a low-output portion. Therefore, there are effects that a set range of a determination region which is required in color determination is ensured, and that sure color determination and separation can be performed.

Embodiment 3

In Embodiment 2, the method in which color determination is performed with increasing the dynamic range has been described. In Embodiment 3, a configuration where color determination is performed with disposing plural color determining portions will be described with reference to FIG. 5.

Figure 5:
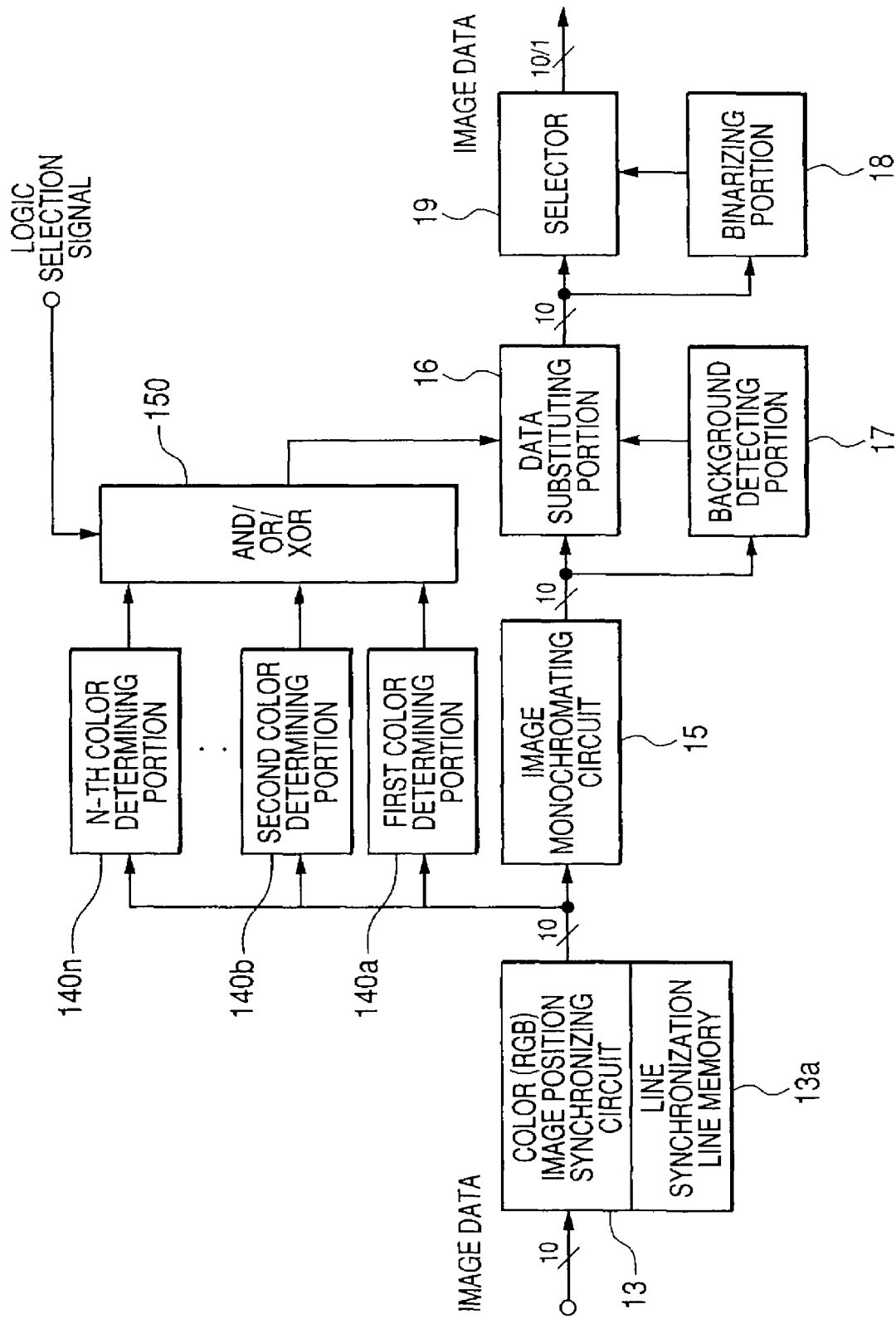
FIG. 5 is a functional block diagram of a dropout processing portion of an image reading apparatus of Embodiment 3 of the invention.

FIG. 5 is a functional block diagram of a dropout processing portion of an image reading apparatus of Embodiment 3 of the invention. In FIG. 5, 140 denotes color determining portions which process a signal branching from the output of the color image position synchronizing circuit 13, to parallel signals, 140*a* denotes a first color determining portion, 140*b* denotes a second color determining portion, and 140*n* denotes an n-th color determining portion. The reference numeral 150 denotes a logic matching portion which performs logic operations on the outputs of the color determining portions 140, and which supplies selected or matched data to the data substituting portion 16 in response to a control signal. In the figure, the same reference numerals as FIG. 1 denote the same or corresponding portions.

In Embodiment 3, plural determining conditions of the plural color determining portions can be combined with one another. Namely, an output in which determination results are combined and selected by interposing predetermined logic circuits such as an OR circuit, an AND circuit, and an XOR circuit is supplied to the data substituting portion. In the case where plural colors are to be skipped (to be dropped out), for example, the plural color determining portions 140 are used and their determination results are selected by an OR circuit, so that dropout designation is enabled for all the dropout colors. When matching is performed on data of the color determining portions 140 themselves by using an AND circuit, and a result is output from the logic matching portion, it is possible to eliminate a data failure due to digital noises.

Also with respect to a written or selected mark which is read as a color similar to a dropout color, the color determining portions 140 designate the color of the written or selected mark, and the results of the determination are combined with one another by means of XOR, whereby a pixel which is determined to be significant in the color determination results of the written or selected mark is eliminated from dropout designation pixels that are designated in the color determination. Namely, a part of the color determining portions 140 is used as a color detecting circuit, and, for the outputs of the color determining portions 140 with respect to other dropout colors, used as the color detection, whereby a mark color which is hardly determined can be detected.

Embodiment 4

Figure 6:
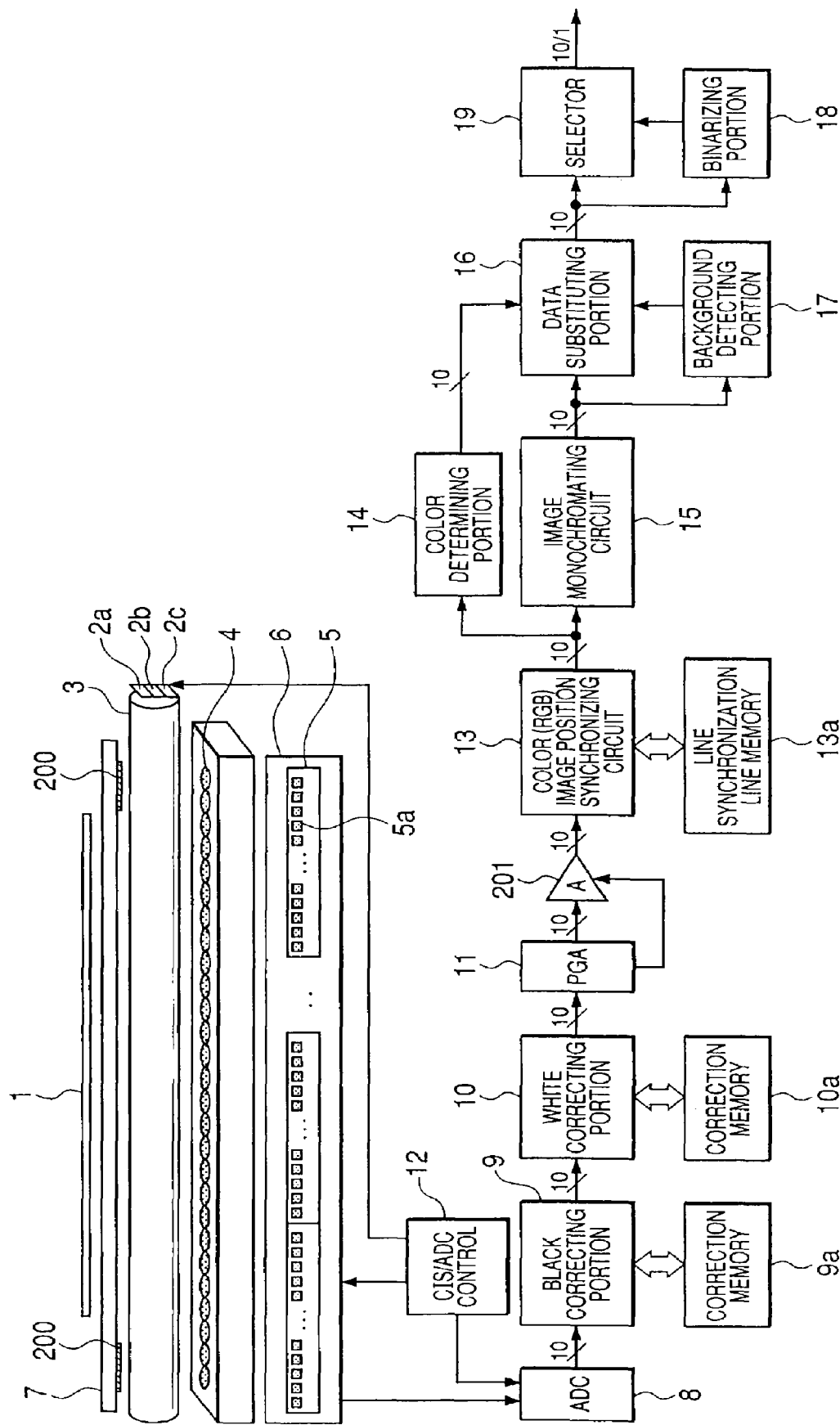
FIG. 6 is a functional block diagram of an image reading apparatus of Embodiment 4 of the invention.

In Embodiments 1 to 3, the basic configuration and configuration of the image reading apparatus have been mainly described. In Embodiment 4, an image reading apparatus in which the accuracy of a read image can be ensured even when reading variations occur due to an environmental change caused by, for example, variations of the ambient temperature, a supplied power source voltage, illumination of the used light source, and the like will be described with reference to FIG. 6. FIG. 6 is a functional block diagram of the image reading apparatus of Embodiment 4 of the invention. In FIG. 6, 200 denotes a reference plate which is disposed outside the original reading width, and 201 denotes a digital variable portion which is disposed in front of the color image position synchronizing circuit 13. In the figure, the same reference numerals as FIG. 1 denote the same or corresponding portions.

Referring to FIG. 6, the reference plate 200 is disposed on the transmission member 7 or outside the reading region for the original 1, and configured by a reflection member having a high reflectance. Embodiment 4 has a structure in which a white sheet is applied to the transmission member 7. The embodiment has a feedback configuration in which, in the image reading operation, an output value from the reference plate (reference white original) is always monitored, an initial reading result is stored in a nonvolatile memory (not shown) or the like, and a gain is applied to the image signal by the digital variable portion 201 so that, with respect to variations of read image data, the value of the reference white portion is always a constant value asymptotic to the initial data. Namely, the embodiment is configured so that light which is emitted from the light source 2 and reflected from the reference plate 200 is photoelectric converted as a reference signal by the pixel 5a in the periphery of an end portion, and every line output is read in the reading operation.

Figure 7:
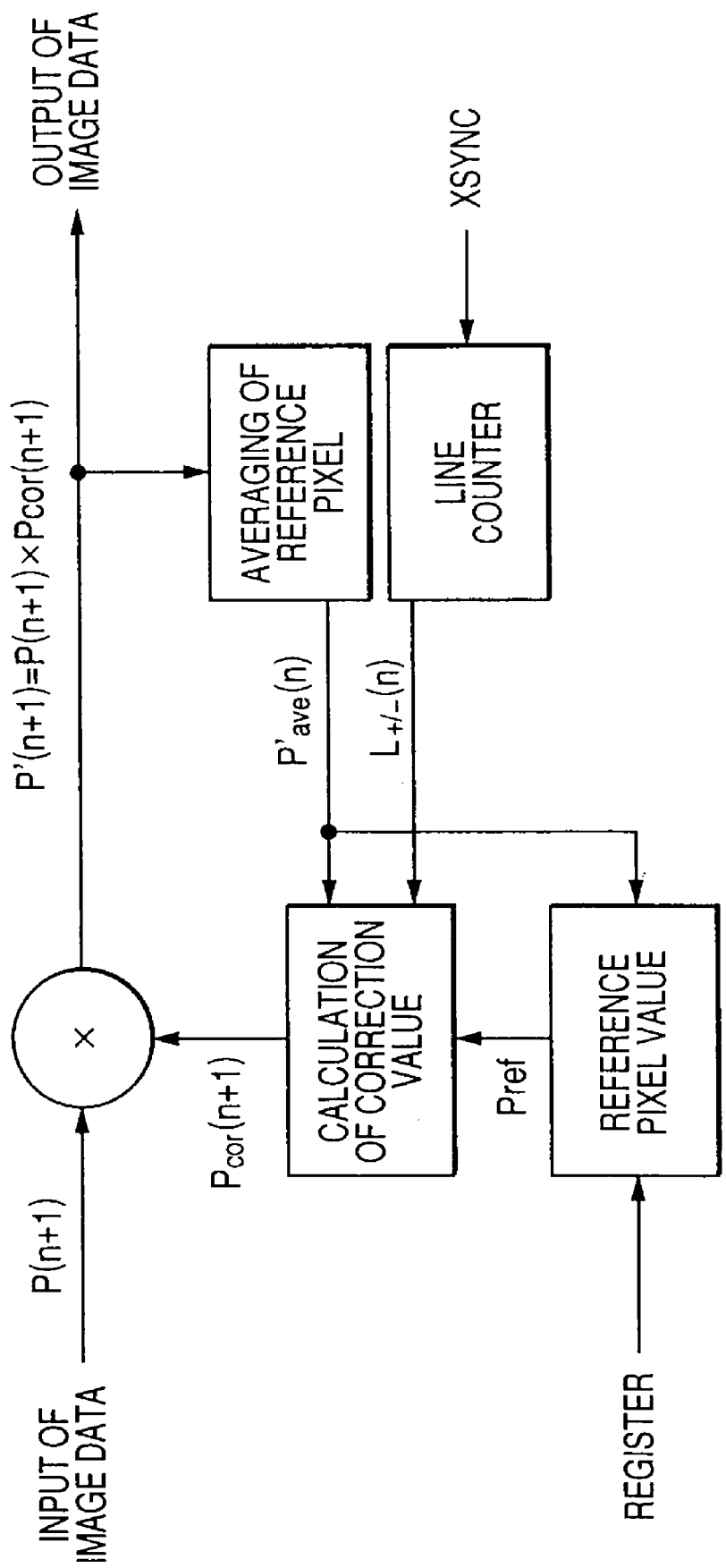
FIG. 7 is a view illustrating a gain setting method by a multiplier of the image reading apparatus of Embodiment 4 of the invention.

When the reference plate 200 is disposed in this way, the output from the reference plate 200 is always constant in the case where the quantity of light of the light source is not varied from the initial value. When the light source 2 is varied, although the quantity of light is changed also in the reference plate 200 and also image data which have passed through the black and white correcting portions are varied, information of the PGA from the pixel 5a corresponding to the position of the reference plate 200 is adjusted by the digital variable portion 201, so that, as in an example shown in FIG. 7, a process of a feedback system is performed on the image data input and the image data output by using a multiplier to automatically set the gain. Namely, reference pixels are averaged, a correction value calculation is performed by using a system clock signal (XSYNC) and a register signal to determine a correction coefficient (Pcor), and the gain is made variable by the multiplier.

As described above, light reflected from the reference plate 200 is always read by using a part of the pixel 5a, and the digital variable portion is disposed so that it is compared with RGB reference values which are preset in the PGA 11, the digital variable portion 201, or the like, whereby the constant output is sent to the image position synchronizing circuit 13. Therefore, image data of the constant range are always input into the color determining portion 14, thereby enabling stable color determination to be performed. The reference values are set for RGB, respectively. Alternatively, one of RGB may be used.

In Embodiments 1 to 4, the three RGB light sources which allow a color image to be read are used. In the case where it is not required to read a color image, a combination of light sources which is optimum to the spectral reflection spectrum of the read object is employed to enable a more effective process of reading a form sheet or the like. Namely, when a light source other than RGB, such as an IR light source, a yellow-green light source, or a blue-green light source is employed, the determination accuracy is improved by collecting characteristic color images in the spectral reflection spectrum. When two or more wavelengths are used in the determination, reasonable effects are attained.

What is claimed is:

1. An image reading apparatus comprising:
a light source which sequentially emits lights having a plurality of colors with a plurality of wavelengths to an original;
a lens which converges lights reflected from the original;
a light receiver including a plurality of pixels, each of which receives lights converged by the lens and performs photoelectric conversion to obtain analog signals for respective colors;
an analog-to-digital converter which analog-to-digital converts the analog signals obtained by the light receiver to obtain digital photoelectric conversion outputs, respectively;
a correcting portion which corrects the digital photoelectric conversion outputs;
a synchronizing circuit which synchronizes the corrected digital photoelectric conversion outputs from a same pixel with each color and outputs output signals for entire pixels;
a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively;
an image monochromating circuit which receives the output signals from the synchronizing circuit, multiplies the output signals by constant data defined for each color, respectively and adds the multiplied output signals from the same pixel to outputs the addition result as monochrome data;
a data substituting portion which receives the monochrome data, substitutes the monochrome data corresponding to the pixel position information from the color determining portion with a level at which the pixel is determined as a white level in a binarizing process, and outputs a signal; and
an output portion which binarizes the signal output from the data substituting portion and outputs the binarized signal.

2. The image reading portion according to claim 1, wherein the correcting portion includes:
a black correcting portion which receives the digital photoelectric conversion outputs and performs a black correction with which digital photoelectric conversion outputs from each pixel at a dark time becomes even; and
a white correcting portion which receives the digital photoelectric conversion outputs subjected to the black correction and performs a white correction with which digital photoelectric conversion outputs from each pixel at a bright time becomes even.

3. An image reading apparatus comprising:
a light source which sequentially emits lights having a plurality of colors with a plurality of wavelengths to an original;
a lens which converges lights reflected from the original;
a light receiver including a plurality of pixels, each of which receives lights converged by the lens and performs photoelectric conversion to obtain analog signals for respective colors;
an analog-to-digital converter which analog-to-digital converts the analog signals obtained by the light receiver to obtain digital photoelectric conversion outputs, respectively;
a correcting portion which corrects the digital photoelectric conversion outputs;
a synchronizing circuit which synchronizes the corrected digital photoelectric conversion outputs from a same pixel with each color and outputs output signals for entire pixels;
a multiplier which performs multiplication on the output signals from the synchronizing circuit for each color;
a color determining portion which receives the multiplied output signals from the multiplier, determines whether the multiplied output signals for respective colors from the same pixel are within predetermined ranges, respectively, and outputs, as dropout data, pixel position information of the pixel, the outputs signals from which are within the predetermined ranges, respectively;

an image monochromating circuit which receives the output signals from the synchronizing circuit, multiplies the output signals by constant data defined for each color, respectively and adds the multiplied output signals from the same pixel to outputs the addition result as monochrome data;

a data substituting portion which receives the monochrome data, substitutes the monochrome data corresponding to the pixel position information from the color determining portion with a level at which the pixel is determined as a white level in a binarizing process, and outputs a signal; and an output portion which binarizes the signal output from the data substituting portion and outputs the binarized signal.

4. The image reading portion according to claim 3, wherein the correcting portion includes:
   a black correcting portion which receives the digital photoelectric conversion outputs and performs a black correction with which digital photoelectric conversion outputs from each pixel at a dark time becomes even; and
   a white correcting portion which receives the digital photoelectric conversion outputs subjected to the black correction and performs a white correction with which digital photoelectric conversion outputs from each pixel at a bright time becomes even.

5. An image reading apparatus comprising:
a light source which sequentially emits lights having a plurality of colors with a plurality of wavelengths to an original;
a lens which converges lights reflected from the original;
a light receiver including a plurality of pixels, each of which receives lights converged by the lens and performs photoelectric conversion to obtain analog signals for respective colors;
an analog-to-digital converter which analog-to-digital converts the analog signals obtained by the light receiver to obtain digital photoelectric conversion outputs, respectively;
a correcting portion which corrects the digital photoelectric conversion outputs;
a synchronizing circuit which synchronizes the corrected digital photoelectric conversion outputs from a same pixel with each color and outputs output signals for entire pixels;
a plurality of color determining portions, each of which receives the outputs signals from the synchronizing circuit, determines whether the output signals for respective colors from the same pixel are within predetermined ranges, respectively, and outputs, as dropout data, pixel position information of the pixel, the output signals from which are within the predetermined ranges, respectively, wherein the ranges are different between the plurality of color determining portions;
a logic matching portion which matches or selects the pixel position information from the plurality of color determining portions according to a selection signal;
an image monochromating circuit which receives the output signals from the synchronizing circuit, multiplies the output signals by constant data defined for each color, respectively and adds the multiplied output signals from the same pixel to outputs the addition result as monochrome data;

a data substituting portion which receives the monochrome data, substitutes the monochrome data corresponding to the pixel position information selected or matched in the logic matching portion according to the selection signals with a level at which the pixel is determined as a white level in a binarizing process, and outputs a signal; and an output portion which binarizes the signal output from the data substituting portion and outputs the binarized signal.

6. The image reading portion according to claim 5, wherein the correcting portion includes:
   a black correction porting which receives the digital photoelectric conversion outputs and performs a black correction with which digital photoelectric conversion outputs from each pixel at a dark time becomes even; and
   a white correction porting which receives the digital photoelectric conversion outputs subjected to the black correction and performs a white correction with which digital photoelectric conversion outputs from each pixel at a bright time becomes even.

7. An image reading apparatus comprising:
a light source which sequentially emits lights having a plurality of color with a plurality of wavelengths to an original, and which is longer than an original reading width;
a reference plate which is disposed outside the original reading width;
a lens which converges lights reflected from the reference plate and the original;
a light receiver including a plurality of pixels, each of which receives lights converged by the lens and performs photoelectric conversion to obtain analog signals for respective colors;
an analog-to-digital converter which analog-to-digital converts the analog signals obtained by the light receiver to obtain digital photoelectric conversion outputs, respectively;
a correcting portion which corrects the digital photoelectric conversion outputs;
a digital variable portion which compares information obtained by reading light reflected from the reference plate with a predetermined reference value and which adjusts the corrected digital photoelectric conversion outputs;
a synchronizing circuit which synchronizes the adjusted digital photoelectric conversion outputs from a same pixel with each color and outputs output signals for entire pixels;
a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively;
an image monochromating circuit which receives the output signals from the synchronizing circuit, multiplies the output signals by constant data defined for each color, respectively and adds the multiplied output signals from the same pixel to outputs the addition result as monochrome data;
a data substituting portion which receives the monochrome data, substitutes the monochrome data corresponding to the pixel position information from the color determining portion with a level at which the pixel is determined as a white level in a binarizing process, and outputs a signal; and an output portion which binaries the signal output from the data substituting portion and outputs the binarized signal, wherein, if the information obtained by reading light reflected from the reference plate is higher than the predetermined reference value, the digital variable portion decreases the corrected digital photoelectric conversion outputs, and if the information obtained by reading light reflected from the reference plate is lower than the predetermined value, the digital variable portion increases the corrected digital photoelectric conversion outputs such that input of the synchronizing circuit to be the predetermined reference value.

8. The image reading portion according to claim 7, wherein the correcting portion includes:
   a black correcting portion which receives the digital photoelectric conversion outputs and performs a black correction with which digital photoelectric conversion outputs from each pixel at a dark time becomes even; and
   a white correcting portion which receives the digital photoelectric conversion outputs subjected to the black correction and performs a white correction with which digital photoelectric conversion outputs from each pixel at a bright time becomes even.

9. An image reading apparatus comprising:
   a light source which sequentially emits lights having a plurality of colors with a plurality of wavelengths to an original;
   a lens which converges lights reflected from the original;
   a light receiver including a plurality of pixels, each of which receives lights converged by the lens and performs photoelectric conversion to obtain analog signals for respective colors;
   an analog-to-digital converter which analog-to-digital converts the analog signals obtained by the light receiver to obtain digital photoelectric conversion outputs, respectively;
   a correcting portion which corrects the digital photoelectric conversion outputs;
   a synchronizing circuit which synchronizes the corrected digital photoelectric conversion outputs from a same pixel with each color and outputs output signals for entire pixels;
   a color determining portion which receives the output signals from the synchronizing circuit, determines whether the output signals for respective colors from the same pixel are within predetermined ranges, respectively, and outputs, as dropout data, pixel position information of the pixel, the outputs signals from which are within the predetermined ranges, respectively;
   an image monochromating circuit which receives the output signals from the synchronizing circuit, multiplies the output signals by constant data defined for each color, respectively and adds the multiplied output signals from the same pixel to outputs the addition result as monochrome data;
   a background detecting portion which receives the monochrome data from the image monochromating circuit, and which detects a peak output of the monochrome data;
   a data substituting portion which receives the monochrome data and the peak output of the monochrome data, substitute the monochrome data corresponding to pixel position information from the color determining portion with the peak output of the monochrome data at which the pixel is determined as a white level in binarizing process, and outputs a signal; and
   an output portion which binarizes the signal output from the data substituting portion and outputs the binarized signal.

10. The image reading portion according to claim 9, wherein the correcting portion includes:
   a black correcting portion which receives the digital photoelectric conversion outputs and performs a black correction with which digital photoelectric conversion outputs from each pixel at a dark time becomes even; and
   a white correcting portion which receives the digital photoelectric conversion outputs subjected to the black correction and performs a white correction with which digital photoelectric conversion outputs from each pixel at a bright time becomes even.

* * * * *